US008162742B2

(12) United States Patent
Oberberger

(10) Patent No.: US 8,162,742 B2
(45) Date of Patent: Apr. 24, 2012

(54) ADJUSTING PAYBACK DATA BASED ON SKILL

(75) Inventor: Michael M. Oberberger, Reno, NV (US)

(73) Assignee: IGT, Reno, NV (US)

( * ) Notice: Subject to any disclaimer, the term of this patent is extended or adjusted under 35 U.S.C. 154(b) by 456 days.

(21) Appl. No.: 12/270,299

(22) Filed: Nov. 13, 2008

(65) Prior Publication Data

US 2010/0120502 A1 May 13, 2010

(51) Int. Cl.
*A63F 13/00* (2006.01)

(52) U.S. Cl. ................. 463/20; 463/25; 463/40; 463/43

(58) Field of Classification Search .................... 463/20, 463/25, 40, 43
See application file for complete search history.

(56) References Cited

U.S. PATENT DOCUMENTS 5,542,669 A 8/1996 Charron et al.
6,729,956 B2 5/2004 Wolf et al.
7,192,346 B2 3/2007 Mathis
7,291,066 B2 11/2007 Gauselmann
7,316,609 B2 1/2008 Dunn et al.
7,364,159 B2 4/2008 Berman et al.
7,419,430 B1 9/2008 Joshi et al.
2004/0048644 A1 3/2004 Gerrard et al.
2005/0233791 A1* 10/2005 Kane ................................ 463/6
2006/0030400 A1 2/2006 Mathis
2006/0205484 A1 9/2006 Nicastro
2006/0249904 A1* 11/2006 Matheson et al. ............ 273/292
2007/0066382 A1* 3/2007 Penrice ........................... 463/16
2007/0066403 A1* 3/2007 Conkwright .................... 463/43
2007/0099689 A1* 5/2007 Penrice ........................... 463/17
2007/0287532 A1* 12/2007 Jackson .......................... 463/25
2008/0207312 A1 8/2008 Seelig et al.

OTHER PUBLICATIONS

PCT, International Search Report, and Written Opinion of the International Searching Authority, International Application No. PCT/US2009/063476, Dec. 29, 2009, 12 pages.

* cited by examiner

*Primary Examiner* — Dmitry Suhol
*Assistant Examiner* — Brandon Gray
(74) *Attorney, Agent, or Firm* — Armstrong Teasdale LLP

(57) ABSTRACT

A gaming device including an interface unit configured to accept game play data from a player and a controller coupled to the interface unit. The controller includes a processor and a memory, wherein the memory stores payback data. The processor is configured to receive, via the interface unit, the game play data for the player playing a game, evaluate the received game play data based on predefined criteria, determine a level of skill of the player based at least on the evaluated game play data, and adjust the payback data based on the determined level of skill of the player.

21 Claims, 7 Drawing Sheets

ADJUSTING PAYBACK DATA BASED ON SKILL

BACKGROUND

Games of chance have existed for much of the past few centuries. Such games take several forms. For example, a game of chance could be a game similar to bingo where numbers are randomly selected or a game based on an outcome of a roll of dice. Over the past several decades, games of chance have been games whose outcome is based on output of a random number generator (RNG) in a gaming machine, such as a slot machine. Typically, these games were based on pure chance as such an approach allowed a gaming establishment to have tight control over the odds of a game over time.

One reason games of chance in a gaming establishment are popular is because an amateur, novice, or inexperienced player can play the games at the player's own pace with no required skills, strategy, or risk evaluation and perform as well as a seasoned or experienced slot game player. For example, most slot machines are set to payback on average between 80% and 99% of amounts that players wager. In most modern slot machines, a processor controlling the gaming machine randomly determines outcomes and awards.

While most of the games in a gaming establishment have historically been games of pure chance, lately, gaming establishments have seen an increasing popularity of games that involve certain player strategy, or decision-making, such as blackjack and more recently, an explosive growth of various types of poker. These games generally require a certain level of strategy and skill to be successful. Gaming establishments are interested in capitalizing on the popularity of such games and creating games that cater to demographics that are interested in games that have some element of skill associated with the outcome because many known games of chance do not appeal to people who have played skill based games that reward skill and strategy. These people may not want to play games of chance that are purely based on randomly generated outcomes and involve no skill or little skill. These people enjoy the competitive nature of skill games. Skill games that many people have especially grown accustomed to and comfortable with playing are arcade skill games, home video skill games, computer skill games, handheld device skill games, and data network (e.g., Internet) skill games. These games of skill require strategy or timing of inputs by the player to determine success and failure.

SUMMARY

The present disclosure expands on a desire of gaming establishments to cater to a group of players who are interested in games of chance that feature an element of skill. The present disclosure describes a use of payback data that includes an adjustable pay table, such as a "look-up table" that provides better payouts to a player who is skilled.

In embodiments, described herein is a gaming device including an interface unit configured to accept game play data from a player, and a controller coupled to the interface unit. The controller includes a processor and a memory, wherein the memory stores payback data. The processor is configured to receive, via the interface unit, the game play data for the player playing a game, evaluate the received game play data based on predefined criteria, determine a level of skill of the player based at least on the evaluated game play data, and adjust the payback data based on the determined level of skill of the player.

In further embodiments, described herein is a system including at least one server. The server includes a memory configured to store player data and payback data for a game of skill, wherein the player data includes a level of skill of the player. The system further includes a plurality of gaming machines communicatively coupled to the at least one server via a gaming network. Each of the plurality of gaming machines includes a processor programmed to receive game play data from the player playing one or more gaming sessions, and providing the received game play data to the server for evaluation. The server determines a level of skill of the player based on the evaluated game play data, adjusts the payback data stored in the memory based on the determined level of skill of the player, and updates the level of skill of the player stored in the memory.

In still further embodiments, described herein is a method including accessing payback data for a game, controlling one or more sessions of the game for a player, and determining at least one occurrence of a wager triggering event during play of the one or more sessions of the game. The method further comprises evaluating, based at least on the determined occurrence of the wager triggering event, performance of the player during the one or more sessions of the game, determining a level of skill of the player based on the evaluated performance of the player, and adjusting the accessed payback data based on the determined level of skill.

BRIEF DESCRIPTION OF THE DRAWINGS

The present disclosure is described in detail below with reference to the attached drawing figures.

DETAILED DESCRIPTION

In embodiments, the present disclosure describes gaming devices, systems, and methods for adjusting a pay table based on predefined criteria, such as, a level of skill of the player, or how much money the player has spent at a particular gaming establishment. In embodiments, the present disclosure expands on a desire of gaming establishments to cater to a group of players who are interested in games of chance that feature an element of skill. In embodiments, the present disclosure describes a use of payback data that includes an adjustable pay table, such as a "look-up table" that rewards a player by providing better payouts to a player who possesses a particular level of skill.

In embodiments, the present disclosure may be implemented in various configurations for gaming machines or gaming devices, including but not limited to: (1) a dedicated gaming machine or gaming device, wherein the computerized instructions for controlling any games (which are provided by the gaming machine or gaming device) are provided with the gaming machine or gaming device prior to delivery to a gaming establishment; and (2) a changeable gaming machine or gaming device, where the computerized instructions for controlling any games (which are provided by the gaming machine or gaming device) are downloadable to the gaming machine or gaming device through a data network when the gaming machine or gaming device is in a gaming establishment.

Figure 2A:
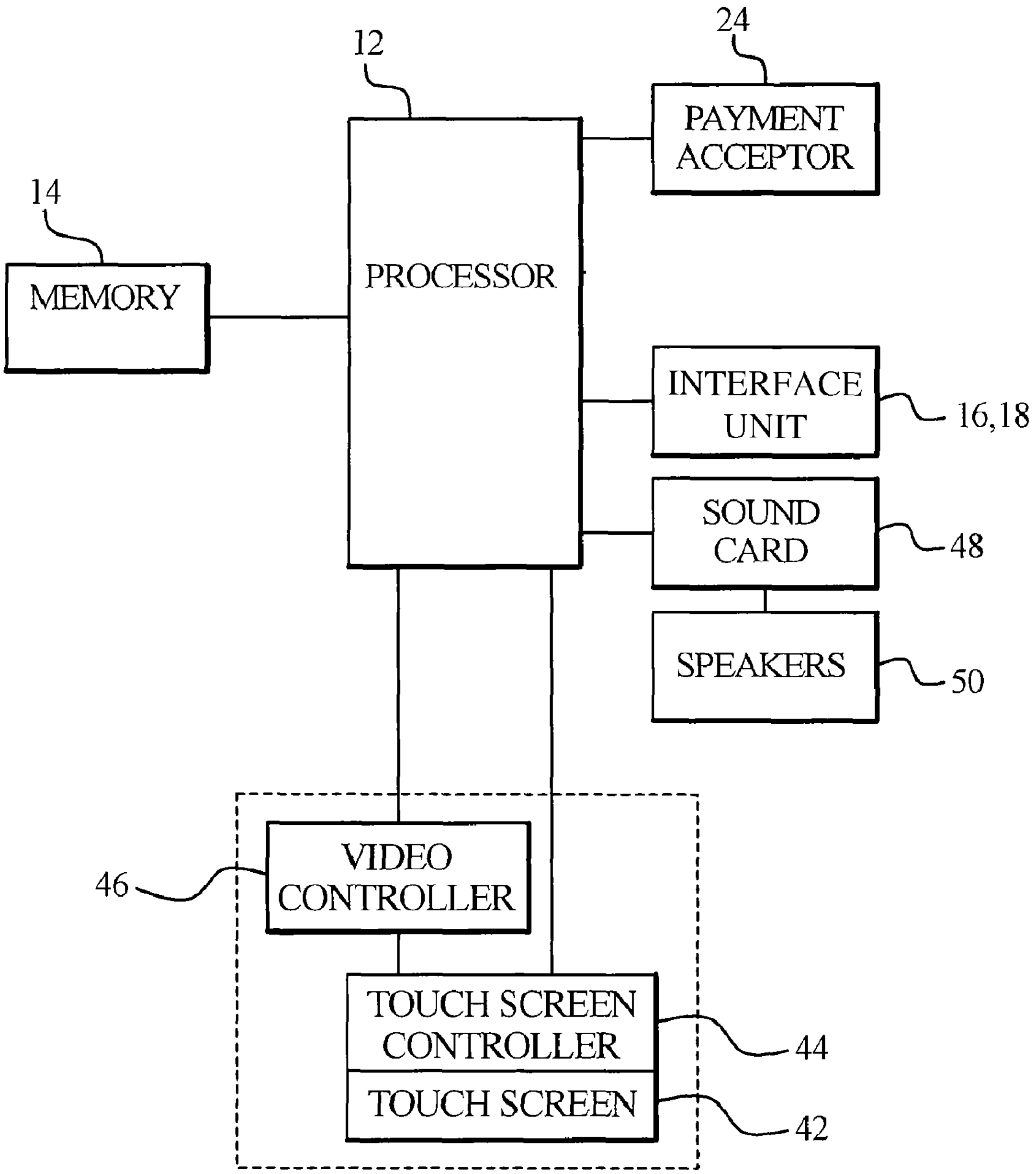
FIG. 2A is a block diagram of an exemplary electronic configuration of the gaming devices.
Figure 2B:
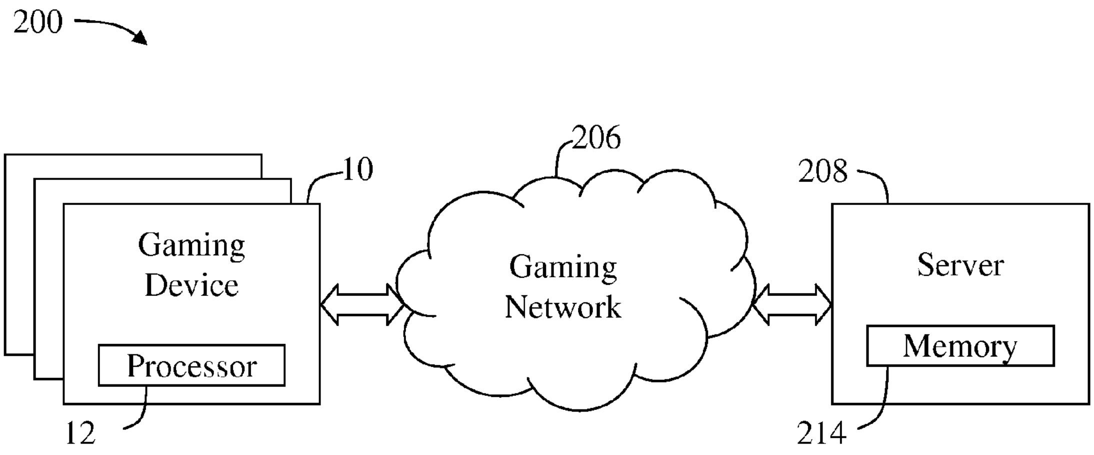
FIG. 2B is a block diagram of a plurality of gaming terminals in communication with a central controller via a gaming network.

As illustrated in FIG. 2B, in embodiments, the computerized instructions for controlling any games are executed by a server, for example, a central controller or remote host. In such a "thin client" embodiment, the server remotely controls any games (or other suitable interfaces) via gaming network and the gaming device 10 is utilized to display such games (or suitable interfaces) and receive one or more inputs or commands from a player.

In another embodiment, the computerized instructions for controlling any games are communicated from the server to a gaming device local processor and memory. In such a "thick client" embodiment, the gaming device local processor executes the communicated computerized instructions to control any games (or other suitable interfaces) provided to a player.

Exemplary Gaming Devices

In embodiments, one or more of the gaming device 10 in a gaming system may be thin client gaming devices and one or more gaming devices in the gaming system may be thick client gaming devices. In another embodiment, certain functions of the gaming device are implemented in a thin client environment and certain other functions of the gaming device are implemented in a thick client environment. In one such embodiment, computerized instructions for controlling any games are communicated from the central server to the gaming device in a thick client configuration and computerized instructions for controlling any secondary games or bonus functions are executed by the server 208 in a thin client configuration.

Figure 1A:
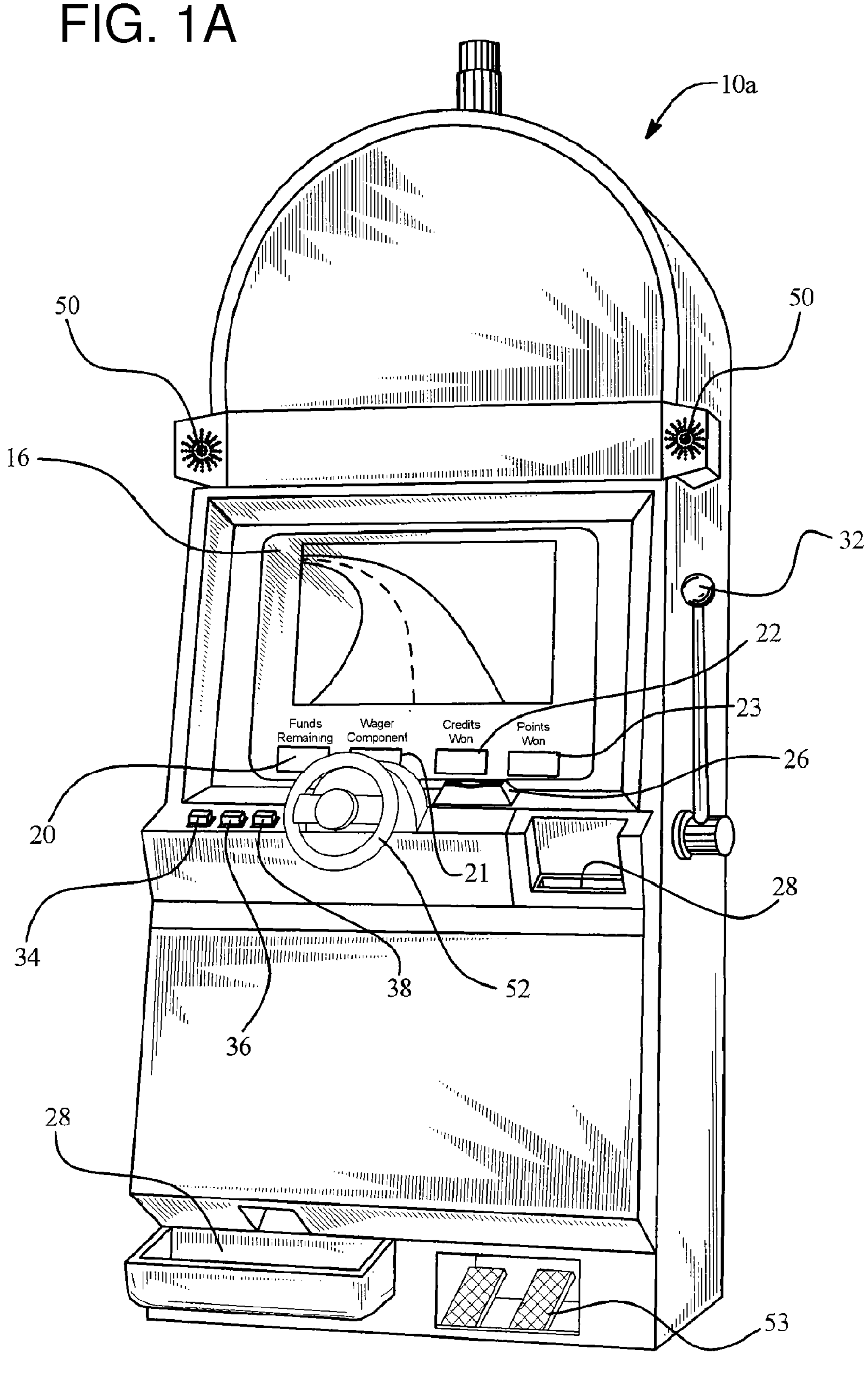
FIGS. 1A and 1B are perspective views of exemplary gaming devices.
Figure 1B:
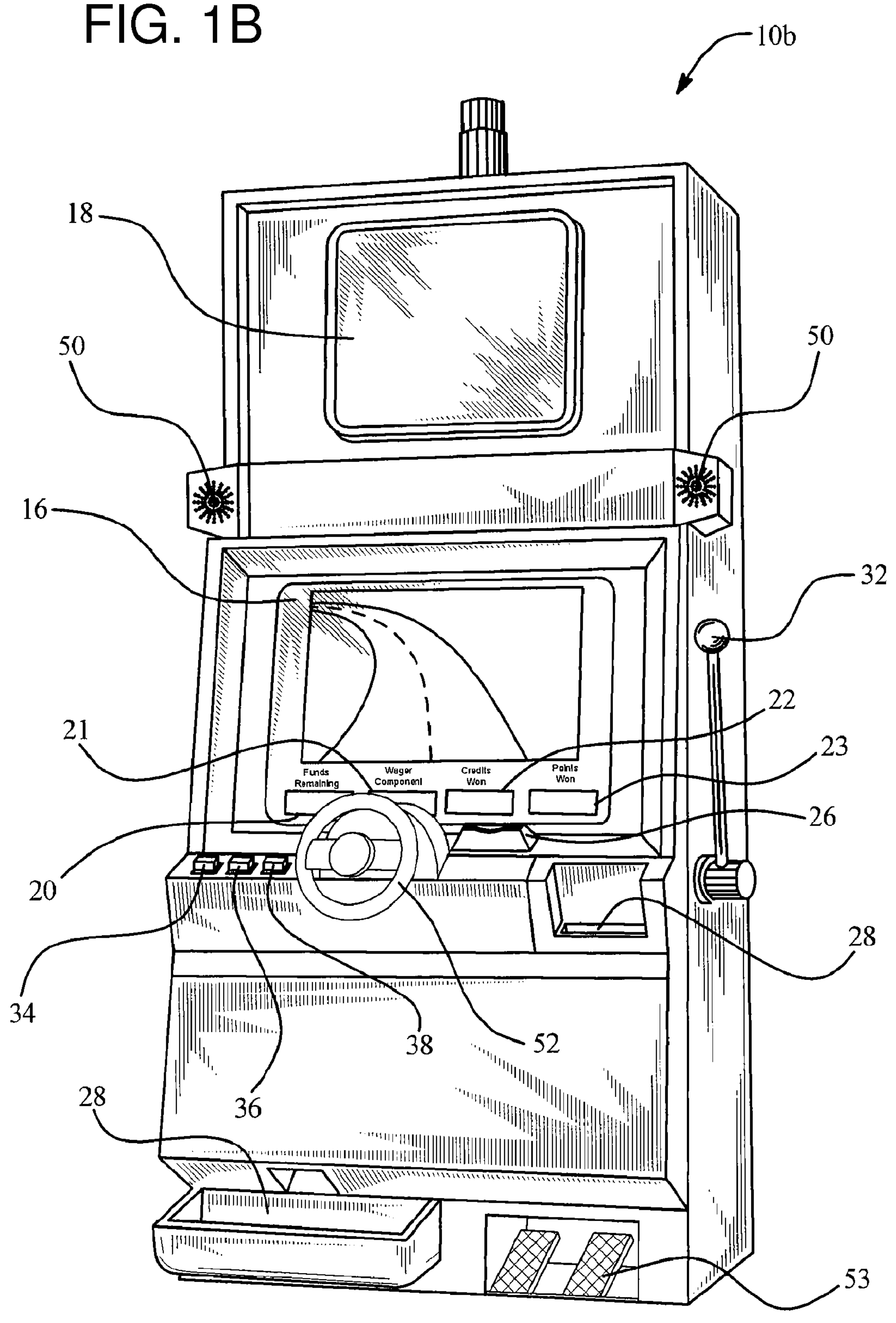

Referring now to FIGS. 1A and 1B, two example alternative embodiments of the gaming device are illustrated as gaming device 10*a* and gaming device 10*b*, respectively. Gaming device 10*a* and/or gaming device 10*b* are generally referred to herein as gaming device 10.

In embodiments illustrated in FIGS. 1A and 1B, gaming device 10 has a support structure, housing or cabinet which provides support for a plurality of interface units, displays, inputs, controls and other features of a conventional gaming machine. It is configured so that a player can operate it while standing or sitting. The gaming device 10 may be positioned on a base or stand or can be configured as a pub-style table-top game (not shown) which a player can operate preferably while sitting. As illustrated by the different configurations shown in FIGS. 1A and 1B, the gaming device 10 may have varying cabinet and display configurations.

In embodiments, as illustrated in FIG. 2A, the gaming device 10 preferably includes a controller including at least one processor 12 or other suitable controller, such as a microprocessor, a microcontroller-based platform, a suitable integrated circuit or one or more application-specific integrated circuits (ASIC's). The processor 12 is in communication with or operable to access or to exchange signals with at least one data storage or memory 14. In one embodiment, the processor 12 and the memory 14 reside within the cabinet of the gaming device 10. The memory 14 stores program code and instructions, executable by the processor 12, to control the gaming device 10. The memory 14 also stores other data such as image data, event data, player input data, random or pseudorandom number generators, look-up table data, payback data or information and applicable game rules that relate to the play of the gaming device 10. In one embodiment, the memory 14 includes random access memory (RAM), which can include non-volatile RAM (NVRAM), magnetic RAM (MRAM), ferroelectric RAM (FeRAM) and other forms as commonly understood in the gaming industry. In one embodiment, the memory 14 includes read only memory (ROM). In one embodiment, the memory 14 includes flash memory and/or EEPROM (electrically erasable programmable read only memory). Any other suitable magnetic, optical and/or semiconductor memory may operate in conjunction with the gaming device 10 disclosed herein.

In embodiments, the processor 12 is configured to execute computer-executable instructions to receive, via an interface unit, the game play data for the player playing a game, evaluate the received game play data based on predefined criteria, determine a level of skill of the player based at least on the evaluated game play data, and adjust the payback data based on the determined level of skill of the player.

In embodiments, part or all of the program code and/or operating data described above can be stored in a detachable or removable memory, including, but not limited to, a suitable cartridge, disk, CD ROM, DVD or USB memory device. In other embodiments, part or all of the program code and/or operating data described above can be downloaded to the memory 14 through a suitable network.

In embodiments, an operator or a player can use such a removable memory in a desktop computer, a laptop personal computer, a personal digital assistant (PDA), portable computing device, or other computerized platform to implement the present disclosure. In one embodiment, the gaming device 10 or gaming machine disclosed herein is operable over a wireless network, such as part of a wireless gaming system. In this embodiment, the gaming machine may be a hand held device, a mobile device or any other suitable wireless device that enables a player to play any suitable game at a variety of different locations. It should be appreciated that the gaming device 10 or gaming machine as disclosed herein may be a device that has obtained approval from a regulatory gaming commission or a device that has not obtained approval from a regulatory gaming commission. It should be appreciated that the processor 12 and the memory 14 may be collectively referred to herein as a "computer" or "controller."

In another embodiment, as discussed in more detail below, the gaming device 10 employs payback data that includes a pay table or look-up table to determine the player's payback based on the player's level of skill. In this embodiment, the gaming device 10 adjusts a current pay table or look-up table or accesses a new table based on the player's level of skill.

As illustrated in FIG. 2A, the gaming device 10 includes one or more interface units 16 controlled by the processor 12. The interface units 16 are preferably connected to or mounted to the cabinet of the gaming device 10. The embodiment shown in FIG. 1A includes an interface unit 16 which displays a game. This interface unit may also display information relating to an interactive game, wager triggering event, or wagering outcome. The alternative embodiment shown in FIG. 1B includes the interface unit 16 and an upper interface unit 18. The upper interface unit 18 may display any wagering outcome, any suitable secondary game associated or not associated with the interactive game and/or information relating to the interactive games. These interface units may also serve as digital glass operable to advertise games or other aspects of the gaming establishment. As seen in FIGS. 1A and 1B, in one embodiment, the gaming device 10 includes a credit or fund display 20 which displays a player's current number of credits, cash, account balance or the equivalent or the original number of credits the player funded the gaming machine with. In one embodiment, the gaming device 10 includes a wager component display 21 which displays the amount of the wager component. In one embodiment, the gaming device 10 includes an amount of credits won display 22 which displays a player's amount won. In one embodiment, the gaming device 10 includes an interactive game display, such as a points display 23 which displays a player's points for the interactive game.

In another embodiment, at least one interface unit may be a mobile display device, such as a PDA or tablet PC, that enables play of at least a portion of the games at a location remote from the gaming device 10.

The interface units may include, without limitation, a monitor, a television display, a plasma display, a liquid crystal display (LCD) a display based on light emitting diodes (LED), a display based on a plurality of organic light-emitting diodes (OLEDs), a display based on polymer light-emitting diodes (PLEDs), a display based on a plurality of surface-conduction electron-emitters (SEDs), a display including a projected and/or reflected image or any other suitable electronic device or display mechanism. In one embodiment, as described in more detail below, the interface unit includes a touch-screen, for example touch-screen 42, with an associated touch-screen controller, for example touch-screen controller 44. The interface units may be of any suitable size and configuration, such as a square, a rectangle or an elongated rectangle.

The interface units of the gaming device 10 are configured to display at least one and preferably a plurality of games or other suitable images, symbols and indicia such as any visual representation or exhibition of a movement of objects such as mechanical, virtual or video reels and wheels, dynamic lighting, video images, images of people, characters, places, things and faces of cards, and the like.

In one alternative embodiment, the symbols, images and indicia displayed on or of the interface unit may be in mechanical form. That is, the interface unit may include any electromechanical device, such as one or more mechanical objects, such as one or more rotatable wheels, reels or dice, configured to display at least one or a plurality of games or other suitable images, symbols or indicia.

As illustrated in FIG. 2A, in one embodiment, the gaming device 10 includes at least one payment acceptor 24 in communication with the processor 12. As seen in FIGS. 1A and 1B, the payment acceptor 24 may include a coin slot 26 and a payment, note or bill acceptor 28, where the player inserts money, coins or tokens. The player can place coins in the coin slot or paper money, a ticket or voucher into the payment, note or bill acceptor. In other embodiments, devices such as readers or validators for credit cards, debit cards or credit slips may accept payment. In one embodiment, a player may insert an identification card into a card reader of the gaming device 10. In one embodiment, the identification card is a smart card having a programmed microchip or a magnetic strip coded with a player's identification, credit totals (or related data) and other relevant information. In another embodiment, a player may carry a portable device, such as a cell phone, a radio frequency identification tag or any other suitable wireless device, which communicates a player's identification, credit totals (or related data) and other relevant information to the gaming device 10. In one embodiment, money may be transferred to the gaming device 10 through electronic funds transfer. When a player funds the gaming device 10, the processor 12 determines an amount of funds entered and displays the corresponding amount on the credit or other suitable display as described above.

As seen in FIGS. 1A, 1B and 2A, in one embodiment, the gaming device 10 includes at least one input device in communication with the processor 12. The input devices can include any suitable device which enables the player to produce an input signal which is received by the processor 12. In one embodiment, after appropriate funding of the gaming device 10, the input device is a game activation device, such as a pull arm 32 or a play button 34 which is used by the player to start any game or sequence of events in the gaming device 10. The play button can be any suitable play activator such as a bet one button, a max bet button or a repeat the bet button. In one embodiment, upon appropriate funding, the gaming device 10 begins the game play automatically. In another embodiment, upon the player engaging one of the play buttons, the gaming device 10 automatically activates game play.

In one embodiment, as shown in FIGS. 1A and 1B, one input device is a bet one button 36. The player places a bet by pushing the bet one button. The player can increase the bet by one credit each time the player pushes the bet one button. When the player pushes the bet one button, the number of credits shown in the credit display preferably decreases by one, and the number of credits shown in the bet display preferably increases by one. In another embodiment, one input device is a bet max button (not shown) which enables the player to bet the maximum wager component permitted for a game of the gaming device 10.

In one embodiment, one input device is a cash out button 38. The player may push the cash out button and cash out to receive a cash payment or other suitable form of payment corresponding to the number of remaining credits. In one embodiment, when the player cashes out, the player receives the coins or tokens in a coin payout tray 40. In one embodiment, when the player cashes out, the player may receive other payout mechanisms such as tickets or credit slips redeemable by a cashier (or other suitable redemption system) or funding to the player's electronically recordable identification card.

In one embodiment, as mentioned above and seen in FIG. 2A, one input device is the touch-screen 42 coupled with a touch-screen controller 44, or some other touch-sensitive display overlay to allow for player interaction with the images on the display. The touch-screen 42 and the touch-screen controller 44 are connected to a video controller 46. A player can make decisions and input signals into the gaming device 10 by touching the touch-screen 42 at the appropriate places. One such input device is a conventional touch-screen button panel.

The gaming device 10 may further include a plurality of communication ports for enabling communication of the processor 12 with external peripherals, such as external video sources, expansion buses, game or other displays, an SCSI port or a key pad.

In one embodiment, as seen in FIG. 2A, the gaming device 10 includes a sound generating device controlled by one or more sounds cards 48 which function in conjunction with the processor 12. In one embodiment, the sound generating device includes at least one and preferably a plurality of speakers 50 or other sound generating hardware and/or software for generating sounds, such as playing music for the game or for other modes of the gaming device 10, such as an attract mode. In one embodiment, the gaming device 10 provides dynamic sounds coupled with attractive multimedia images displayed on one or more of the interface units to provide an audio-visual representation or to otherwise display full-motion video with sound to attract players to the gaming device 10. During idle periods, the gaming device 10 may display a sequence of audio and/or visual attraction messages to attract potential players to the gaming device. The videos may also be customized for or to provide any appropriate information.

In one embodiment, the gaming device 10 may include a sensor, such as a camera in communication with the processor 12 (and possibly controlled by the processor 12) that is selectively positioned to acquire an image of a player actively using the gaming device 10 and/or the surrounding area of the gaming device 10. In one embodiment, the camera may be configured to selectively acquire still or moving (e.g., video) images and may be configured to acquire the images in either an analog, digital or other suitable format. The interface units may be configured to display the image acquired by the camera as well as display the visible manifestation of the game in split screen or picture-in-picture fashion. For example, the camera may acquire an image of the player and the processor 12 may incorporate that image into the interactive and/or secondary game as a game image, symbol or indicia.

In another embodiment, one or more of the gaming device 10 are in communication with the server 208 for monitoring purposes only. That is, each individual gaming device randomly generates the game outcomes to be provided to the player and the server 208 monitors the activities and events occurring on the plurality of gaming devices. In one embodiment, the gaming network includes a real-time or on-line accounting and gaming information system operably coupled to the server 208. The accounting and gaming information system of this embodiment includes a player database for storing player profiles, a player tracking module for tracking players and a credit system for providing automated casino transactions.

In one embodiment, the gaming device 10 disclosed herein is associated with or otherwise integrated with one or more player tracking systems. In this embodiment, the gaming device 10 and/or player tracking system tracks any players gaming activity at the gaming device 10. In one such embodiment, the gaming device 10 and/or associated player tracking system timely tracks when a player inserts their playing tracking card to begin a gaming session and also timely tracks when a player removes their player tracking card when concluding play for that gaming session. In another embodiment, rather than requiring a player to insert a player tracking card, the gaming device 10 utilizes one or more portable devices carried by a player, such as a cell phone, a radio frequency identification tag or any other suitable wireless device to track when a player begins and ends a gaming session. In another embodiment, the gaming device 10 utilizes any suitable biometric technology or ticket technology to track when a player begins and ends a gaming session.

During one or more gaming sessions, the gaming device 10 and/or player tracking system tracks any suitable information, such as any amounts wagered, the interactive game outcomes, wagering outcomes, average wager components and/or the time these wagers are placed. In different embodiments, for one or more players, the player tracking system includes the player's account number, the player's card number, the player's first name, the player's surname, the player's preferred name, the player's player tracking ranking, any promotion status associated with the player's player tracking card, the player's address, the player's birthday, the player's anniversary, the player's recent gaming sessions, or any other suitable data.

In one embodiment, a plurality of gaming devices are capable of being connected together through a data network. In one embodiment, the data network is a local area network (LAN), in which one or more of the gaming devices are substantially proximate to each other and an on-site central server or controller as in, for example, a gaming establishment or a portion of a gaming establishment. In another embodiment, the data network is a wide area network (WAN) in which one or more of the gaming devices are in communication with at least one off-site central server or controller. In this embodiment, the plurality of gaming devices may be located in a different part of the gaming establishment or within a different gaming establishment than the off-site central server or controller. Thus, the WAN may include an off-site central server or controller and an off-site gaming device located within gaming establishments in the same geographic area, such as a city or state. The WAN gaming system may be substantially identical to the LAN gaming system described above, although the number of gaming devices in each system may vary relative to each other.

In another embodiment, the data network is an internet or intranet. In this embodiment, the operation of the gaming device 10 can be viewed at the gaming device 10 with at least one internet browser. In this embodiment, operation of the gaming device 10 and accumulation of credits may be accomplished with only a connection to the server 208 (the internet/intranet server) through a conventional phone or other data transmission line, digital subscriber line (DSL), T-1 line, coaxial cable, fiber optic cable, or other suitable connection. In this embodiment, players may access an internet game page from any location where an internet connection and computer, or other internet facilitator is available. The expansion in the number of computers and number and speed of internet connections in recent years increases opportunities for players to play from an ever-increasing number of remote sites. It should be appreciated that enhanced bandwidth of digital wireless communications may render such technology suitable for some or all communications, particularly if such communications are encrypted. Higher data transmission speeds may be useful for enhancing the sophistication and response of the display and interaction with the player.

In one embodiment, as illustrated in FIG. 2B, one or more of the gaming device 10 are in communication with each other and/or at least one of a server 10 through a gaming network 206. In this embodiment, the server 208 is any suitable server or computing device which includes at least one of a processor and at least one of a memory 214, or storage device. In different such embodiments, the server 208 is a progressive controller or a processor of one of the gaming devices in the gaming system. In these embodiments, the processor 12 of each gaming device is designed to transmit and receive events, messages, commands or any other suitable data or signal between the individual gaming device and the server 208. The gaming device processor, for example the processor 12, is operable to execute such communicated events, messages or commands in conjunction with the operation of the gaming device 10. Moreover, the processor (not shown) of the server 208 is designed to transmit and receive events, messages, commands or any other suitable data or signal between the server 208 and each of the individual gaming devices. The server 208 processor is operable to execute such communicated events, messages or commands in conjunction with the operation of the server 208. It should be appreciated that one, more or each of the functions of the central controller as disclosed herein may be performed by one or more gaming device processors. It should be further appreciated that one, more or each of the functions of one or more gaming device processors as disclosed herein may be performed by the central controller.

In embodiments, the memory 214 is configured to store player data and payback data for a game of skill where the player data includes a level of skill of the player. In embodiments, each of the plurality of the gaming device 10 includes a processor 12 programmed to receive game play data from the player playing one or more gaming sessions, and providing the received game play data to the server for evaluation. In further embodiments, the server 208 determines a level of skill of the player based on the evaluated game play data, adjusts the payback data stored in the memory 214 based on the determined level of skill of the player, and updates the level of skill of the player stored in the memory 214.

In one embodiment, the wagering outcome provided to the player is determined by the server 208 and provided to the player at the gaming device 10. In this embodiment, each of a plurality of such gaming devices are in communication with the server 208. Upon a player initiating game play at one of the gaming devices, the initiated gaming device communicates a game outcome request to the server 208.

In one embodiment, the server 208 receives the game outcome request and randomly generates a wagering outcome based on probability data. In another embodiment, the server 208 randomly generates an outcome for the secondary game based on probability data. In another embodiment, the server 208 randomly generates a game outcome for both the wagering outcome and the secondary game based on probability data. In this embodiment, the server 208 is capable of storing and utilizing program code or other data similar to the processor 12 and the memory 14 of the gaming device 10.

In an alternative embodiment, the server 208 maintains one or more predetermined pools or sets of predetermined wagering outcomes. In this embodiment, the server 208 receives the game outcome request and independently selects a predetermined wagering outcome from a set or pool of game outcomes.

The server 208 communicates the generated or selected wagering outcome to the initiated gaming device. The gaming device 10 receives the generated or selected wagering outcome and provides the wagering outcome to the player. In an alternative embodiment, how the generated or selected wagering outcome is to be presented or displayed to the player, for example a hand of cards dealt in a card game, is also determined by the server 208 and communicated to the initiated gaming device to be presented or displayed to the player. Central production or control can assist a gaming establishment or other entity in maintaining appropriate records, controlling gaming, reducing and preventing cheating or electronic or other errors, reducing or eliminating win-loss volatility, and the like.

As mentioned above, in one embodiment, the present disclosure may be employed in a server based gaming system. In one such embodiment, as described above, one or more gaming devices are in communication with a server 208. The server 208 may be any suitable server or computing device which includes at least one processor, for example the processor 12, and a memory or storage device, for example the memory 14. In alternative embodiments, the server 208 is a progressive controller or another gaming machine in the gaming system. In one embodiment, the memory 14 of the server 208 stores different game programs and instructions, executable by the processor 12, to control the gaming device 10. Each executable game program represents a different game or type of game which may be played on one or more of the gaming devices in the gaming system. Such different games may include the same or substantially the same game play with different pay tables. In different embodiments, the executable game program is for an interactive game, a secondary game or both. In another embodiment, the game program may be executable as a secondary game to be played simultaneous with the play of an interactive game (which may be downloaded to or fixed on the gaming device 10) or vice versa.

In the above embodiment, each gaming device at least includes an interface unit comprising one or more display devices and/or one or more input devices for interaction with a player. A local processor, such as the above-described processor 12 or a processor of a local server, is operable with an interface unit that comprises a display device and/or an input device of one or more of the gaming devices.

In operation, the central controller is operable to communicate one or more of the stored game programs to at least one local processor. In different embodiments, the stored game programs are communicated or delivered by embedding the communicated game program in a device or a component (e.g., a microchip to be inserted in a gaming device), writing the game program on a disc or other media, downloading or streaming the game program over a dedicated data network, internet or a telephone line. After the stored game programs are communicated from the server 208, the local processor executes the communicated program to facilitate play of the communicated program by a player through the interface unit that comprises a display device(s) and/or input device(s) of the gaming device 10. That is, when a game program is communicated to a local processor, the local processor changes the game or type of game played at the gaming device 10.

Adjusting Payback Data

Figure 3:
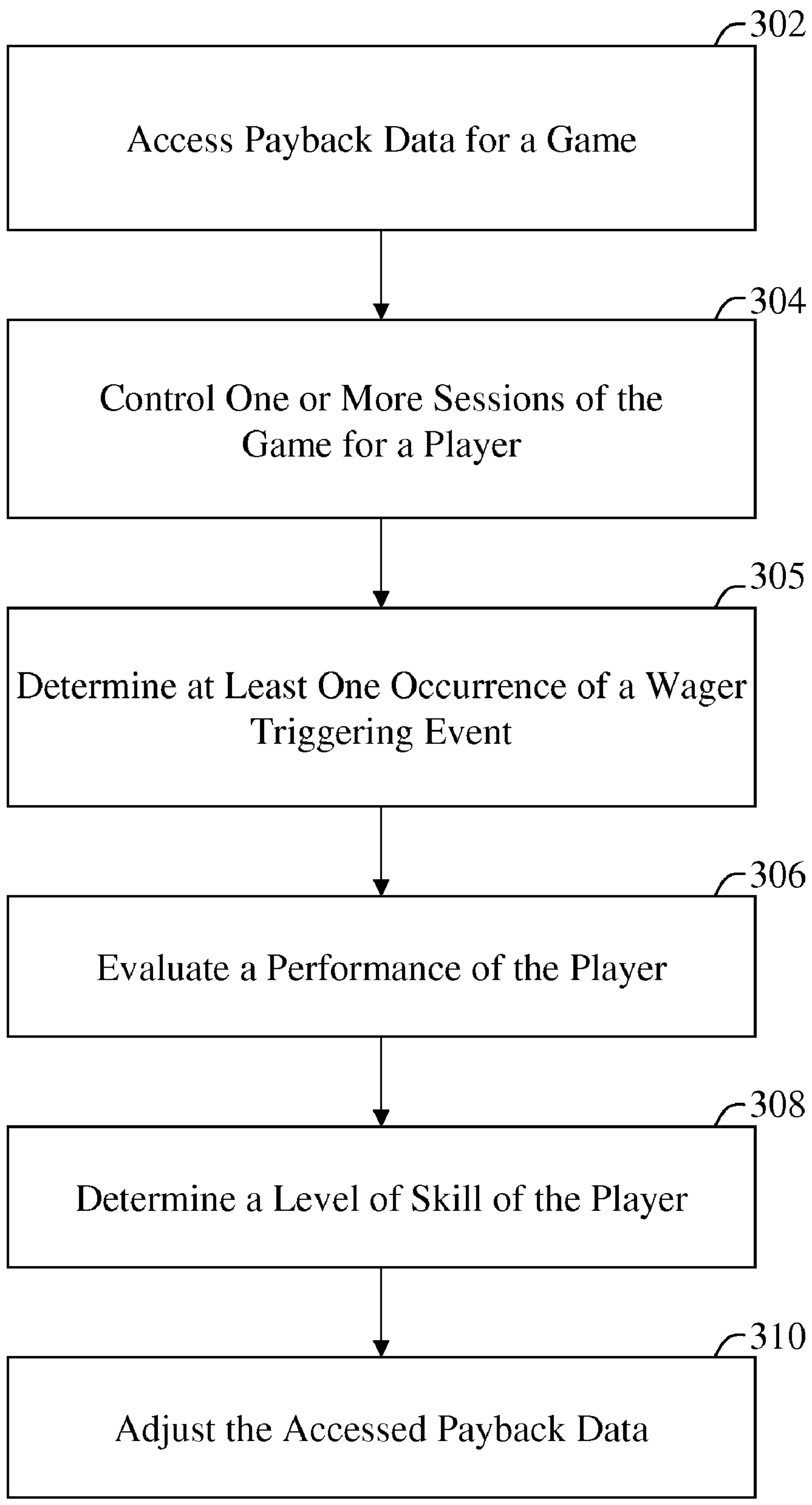
FIG. 3 is a flow diagram of an exemplary method for adjusting payback data based on a level of skill of a player.

Referring now to FIG. 3, once the player funds a gaming machine to initiate an interactive game, payback data for the game is accessed at 302. In an embodiment, upon the player engaging a play button, the gaming device 10 automatically activates game play and one or more sessions of the game are controlled at 304. At 305, at least one occurrence of a wager triggering event (discussed below) during play of the one or more sessions of the game is determined. At 306, a performance of the player during the controlled one or more sessions of the game are evaluated.

An evaluation of a player's performance or skill could take several forms. In embodiments, a player's skill is evaluated based on a player's performance on a previous game. In one embodiment, a player's skill is evaluated based on a set of outcomes of a particular gaming session, where two or more gaming sessions make up an entire game. In further embodiments, a player's skill is evaluated based on a performance of the player over several sessions of a game tracked using a player tracking card or some tracking variant thereof as described above. In still further embodiments, a player's skill may be evaluated using a simple average, or other mathematical formula like weighted averages performance of a player based on just one game like poker, or the player's skill may be evaluated based on his/her performance over one or more sessions of a game involving skill or some subset of games that involve some level of skill. In further embodiments, a level of skill of the player is based on a number of completed triggering events (discussed below).

At 308, a level of skill of the player based on the evaluated performance of the player is determined. A pay table may then be adjusted according to the determined skill level of the player. At 310, the accessed payback data is adjusted based on the determined level of skill of the player.

In embodiments, payback data includes a pay table, such as a look-up table that may be adjusted for a particular player based on a style of play. For example, the gaming establishment may track a number of plays a player makes during a set period of time, as well as an amount bet by the player during the period of time. That is, if the player plays an above average number of hands during the time period, a payout may be increased by, for example, increasing the payout by a particular amount or by increasing the payout by a predefined percentage. In further embodiments, the payout may be increased if it is determined that the player frequently plays "high risk" hands of poker compared to that of normal standard play.

Further, the gaming establishment may determine a winning percentage for the player during a set period of time and compare the winning percentage to a house advantage. Thus, if the player's winning percentage is above the house advantage, the player will be ranked as a skilled player and a pay table may be increased accordingly. In embodiments, a player's skill rating may have multiple levels. In one embodiment, the players may have just two levels of rating: skilled and unskilled. In another embodiment, the players may have multiple levels, for example, level 1 to level 100.

Adjusting a pay table may be accomplished using a variety of approaches including the development of an algorithm or using other static methodologies. For example, in Table 1 (below), a random number generator (RNG) is set to generate a number between 1 and 100. If the RNG output is between 1 and 20, the payout is one credit. If the RNG output is between 21 and 35, the payout is three credits, and so on. In one embodiment, a player who is rated on a scale between 1 and 5 can have that number added to the RNG output. For example, if the RNG output is 44, this equates to a player winning five credits. A player who has a skill ranking of 3 will have the number 3 added to the RNG output of 44 for a final RNG output of 47. Thus, the player's superior skill rating in this example will result in the player winning six credits whereas a player with a skill rating of 1 will have final RNG output of 45 (RNG output of 44+ player rating of one) and will only win five credits.

TABLE 1

Sample Look-up Pay table
(Assume 10 credits are wagered)

| RNG between | | Payback | Odds | Payback |
|---|---|---|---|---|
| 1 | 20 | 1 | 20.00% | 2.00% |
| 21 | 35 | 3 | 15.00% | 6.50% |
| 36 | 45 | 5 | 10.00% | 11.50% |
| 46 | 55 | 6 | 10.00% | 17.50% |
| 56 | 64 | 7 | 9.00% | 23.80% |
| 65 | 72 | 8 | 8.00% | 30.20% |
| 73 | 79 | 9 | 7.00% | 36.50% |
| 80 | 85 | 10 | 6.00% | 42.50% |
| 86 | 88 | 15 | 3.00% | 47.00% |
| 89 | 91 | 20 | 3.00% | 53.00% |
| 92 | 93 | 25 | 2.00% | 58.00% |
| 94 | 95 | 30 | 2.00% | 64.00% |
| 96 | 96 | 40 | 1.00% | 68.00% |
| 97 | 97 | 50 | 1.00% | 73.00% |
| 98 | 98 | 60 | 1.00% | 79.00% |
| 99 | 99 | 80 | 1.00% | 87.00% |
| 100 | 100 | 100 | 1.00% | 97.00% |
| | | | 100.00% | 97% |

In embodiments, there are multiple pay tables based on a variety of different levels of skill. In the example above, a player with a skill rating of 1 on a scale between 1 and 10 (10 being the best) will have pay table A, and a player with a skill rating of 2 will have a pay table B (pay table B having a better pay off than pay table A).

In embodiments, a gaming establishment may reward a player with better payoffs for spending more money at that particular gaming establishment's location. For example, for every $100.00 spent by the player at the gaming establishment's boutique store, a payout of a game may be increased by 0.01%. In another embodiment, the player may earn a different advantage for spending a specific amount in another part of the gaming establishment. In another embodiment, the player may earn an increased payout based on an amount of beverages purchased while playing, for example, by how many bottles of wine were purchased. Such an approach will allow the gaming establishment to enhance its non gaming revenue. Non gaming revenue as a percentage of a total revenue has been a major metric used as an identification of success by major gaming establishments and gaming cities.

In embodiments, if it is determined that a player has a high level of skill, a gaming establishment may increase the odds of winning on a particular game for that player. For example, increasing the odds of winning may include, but is not limited to, adding a wild card to a poker game, allowing a player to recall a bet at anytime prior to the ending of a game, or reducing a number of decks in a shoe during blackjack. One of ordinary skill in the art will appreciate that there are many ways to increase a likelihood of winning on any particular game, each of which are well within the scope of the present disclosure.

Exemplary Games of Skill

As mentioned above, the present disclosure provides an interactive game involving skill, partial skill or pseudo skill requiring one or more player inputs. Gaming device 10 can incorporate any game of skill. The gaming machine or device may include some or all of the features of conventional gaming machines or devices. The gaming device 10 may comprise any suitable game of skill such as, a card game, cascading or falling symbol game, number game, poker game, shooting game, driving game, selection game, blackjack game, trivia game, puzzle game, arcade game or other game of skill susceptible to representation in an electronic or electromechanical form. In one embodiment, the interactive game may include any suitable type and any suitable number of skill events, such as hand-eye coordination events or dexterity events. For example, the interactive game is any suitable type of racing or competitive game, a sports-based game or a shooting game. In another embodiment, the interactive game involves mental skill, knowledge, logical deduction, strategy or any suitable combination thereof. For example, the interactive game may be a trivia game or a memory game.

In an interactive game involving skill, the player inputs result in an interactive game outcome. The gaming machine or the player selects a wager component amount for the gaming machine to automatically wager one or more times. During play of the interactive game, upon the occurrence of each wager triggering event, the gaming machine causes a wagering event to occur. For each of the wagering events, the gaming machine may randomly determine a wagering outcome for the player or access a pay-table to determine the wagering outcome. The gaming machine provides the players awards or prizes based on the wagering outcomes during the interactive game. Upon an interactive game outcome triggering event or upon the end of the interactive game, in one embodiment if the interactive game outcome meets certain criteria, the gaming machine provides the player with an award from marketing dollars. In one embodiment, the interactive game is an arcade game. In one embodiment, the gaming device 10 includes an arcade game which is physically similar in appearance and function to a conventional arcade game or arcade machine. For example, the interactive game may be a boxing game and a wager triggering event is the player placing a punch. In another embodiment, the interactive game is a maze game where the player moves an animated symbol to try to accumulate stationary symbols while navigating around a maze without encountering other enemy animated symbols. The wager triggering event may be accumulating one or more stationary symbols. In one such embodiment, the goal of the interactive game is to accumulate as many stationary symbols as possible. In one embodiment, the triggering event or qualifying condition may be a selected outcome in the interactive game or a particular arrangement of one or more indicia on a interface unit in the interactive game, such as the player obtaining a certain interactive game outcome. In other embodiments, the triggering event or qualifying condition may be by exceeding a certain amount of game play (such as number of games or an amount of time), a wagering outcome, or accumulating a specified number of points during game play.

In one embodiment, each gaming device includes an extra input device for the interactive game. It should be appreciated that the gaming devices may or additionally include any suitable type of input device, including but not limited to: joysticks, keyboards, buttons, wheels, guns and rollerballs. In one embodiment, the display that displays the interactive arcade-type game may be used to display one or more bonus games. It should be appreciated that these gaming devices which include arcade-type interactive games may be placed in any suitable location in a casino or a gaming establishment. In one embodiment, these arcade-type interactive gaming machines are located in separate or designated gaming rooms.

In one embodiment, the gaming machine and system includes more than one interactive game. In one such embodiment, a player may choose which interactive game to play. In a multi-interactive game embodiment, all the players may be ranked against each other for the interactive game based on any suitable means, such as total points in a game. For example, the interactive games include a driving game, a shooting game and a boxing game. In one embodiment, the gaming system scores the interactive games such that it would be fair to rank players against each other based on their performance for different types of games. In another embodiment, there are different and separate rankings for each type of game played. In one embodiment, the gaming system ranks the players of a driving game in a first ranking, the players of the shooting game in a separate second ranking and the players of the boxing game in a separate third ranking. The gaming system may reward the players of the separate rankings in any suitable manner. For example, in one embodiment, upon the occurrence of a triggering event, the gaming system rewards one or more players in each ranking. In another embodiment, the gaming system selects a ranking and provides one or more players on that ranking awards or prizes.

Figure 4:
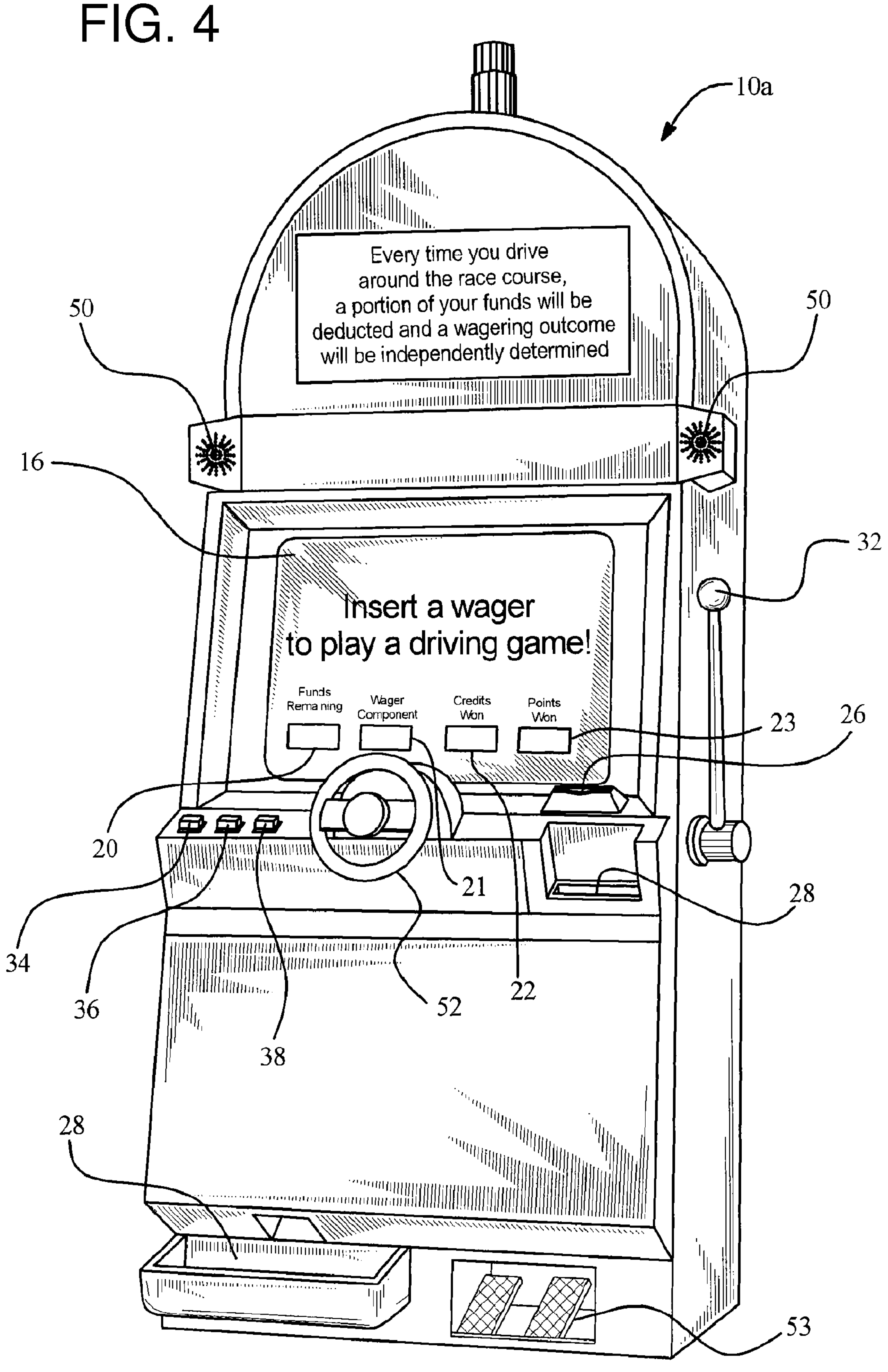
FIG. 4 is a perspective view of an interactive driving game.

FIG. 4 illustrates one embodiment of a gaming system including an interactive driving or racing game. The interactive game of skill requires player inputs as in a conventional arcade game, as generally illustrated in FIG. 4. In this embodiment, the gaming system enables the player to make an input at the gaming device 10 to choose the amount of each of the wager components. In one embodiment, each of the wager components are the same. In other embodiments, one or more of the wager components may vary.

In one embodiment, the gaming device 10 includes a funds remaining display 20, a wager component display 21, a credits won display 22 and a points won display 23. It should be appreciated that the gaming devices may include any suitable number of credit and point displays and meters. The gaming device 10 enables a player to use the steering wheel 52 and other inputs such as pedals 53 to maneuver a on or around the displayed race course in a conventional manner. This interactive game thus requires a plurality of inputs by the player. The gaming device 10 determines the outcome of the interactive game based, at least in part, on the player's performance in the interactive game.

The object of this example of the interactive game may be to achieve the highest place finish, such as by being the first car to cross a finish line on the race course without crashing. In embodiments, a player funds the gaming machine with credits and selects a wager component of, for example, two credits. That is, each time the player completes the course, the gaming device 10 automatically causes the placement of the two credits and determines a wagering outcome based on a current pay table.

The player plays the racing game by using the steering wheel 52 to maneuver on the displayed racetrack. In one embodiment, the gaming device 10 displays the race course to the player. In another embodiment, the gaming device 10 displays other vehicles the player is racing against.

In embodiments, the gaming device 10 informs the player that the player finished the first course and automatically causes the placement of a two credit wager component and determines that the player's wagering outcome is a winning outcome associated with an award of, for example, 10 credits. In embodiments, the player's skill is then evaluated and updated, and the current pay table is either adjusted (increased) or replaced with a pay table that offers a better pay-out. As the player continues play of the interactive game, again, based on the success of the player, the player's skill is evaluated and updated, and the current pay table is either adjusted (increased) or replaced with a pay table that offers a better pay-out.

In one embodiment, the gaming system includes a plurality of gaming devices and a common display or a leaderboard. Each of the gaming devices includes an interactive game. In this illustrated embodiment, the interactive game is a driving game. When a player funds one of the gaming devices, the gaming device 10 enables the player to play the interactive game. In this illustrated embodiment, the wager triggering event is a time period of two seconds. In one embodiment, every time two seconds passes during play of the interactive game, the gaming device 10 automatically causes the placement of 1 credit wager component and determines for the player a wagering outcome. The gaming device 10 determines the wagering outcome independently from the interactive driving game. If the interactive game rank is high enough, the gaming system displays the player's name on the common display or leaderboard. Randomly or upon the occurrence of a triggering event, the gaming system provides one, a plurality or all of the players on the leaderboard, prizes with marketing dollars based on results of the interactive game. In an embodiment, a wager triggering event is when the player drives around the race course or a lap around the race course. Upon completing a lap, the gaming device 10 automatically causes placement of the selected wager component. The gaming device 10 randomly determines for the player a wagering outcome for such wagering event. In an embodiment, a wagering triggering event is when a car or other object is passed. In another embodiment, a wagering triggering event is a particular time completion of a single lap or all laps. In another embodiment, a wagering triggering event is an average speed obtained throughout the game. In another embodiment, a wagering triggering event is a completion of a level. In another embodiment, a wagering triggering event is a high score for a particular day or of the history of that particular game.

Figure 5:
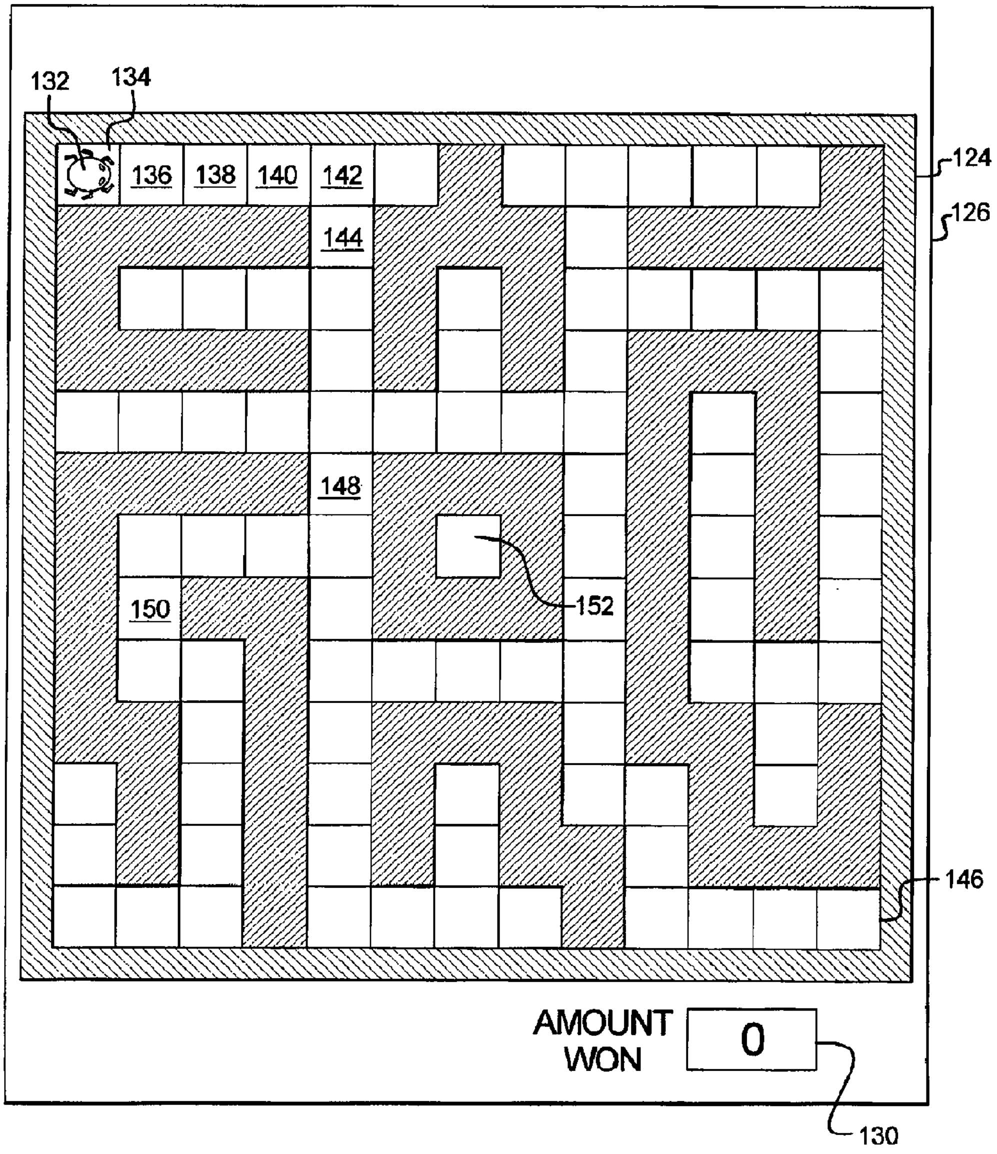
FIG. 5 is an exemplary user interface of a gaming machine streaming wagering awards.

With references now to FIG. 5, an exemplary user interface of a gaming machine streaming wagering awards is shown. In embodiments, a beginning of an interactive game 124 and amount won display 130 is displayed by the display device 126. The game may be any suitable game. In the illustrated game, the player symbol 132 attempts to reach a certain point or location in the maze interactive game 124. For example, the player symbol 132 must get to a certain square 146 in a time period.

In one embodiment, the wager triggering event is the player symbol 132 moving to a new square. For example, the player symbol 132 moves from the first square 134 to the second square 136. The gaming machine independently generates a wagering outcome associated with a wagering award of 25 credits displayed at a first location 152 in the middle of the interactive game. The amount won display displays an award of, for example, 25 credits. In embodiments, if the player symbol 132 moves to a third square 136 causing another wager triggering event. The gaming machine automatically places a wager and determines a wagering outcome associated with a wagering award of, for example, 15.

In embodiments, with each square, the gaming machine generates a wagering outcome and displays any associated wagering awards in certain locations. In the above example, as each new wagering award is generated, the gaming machine displays the previously won wagering awards in a new location. In one embodiment, each time the gaming machine generates a wagering award, the amount won display displays the sum the wagering awards won by the player to the player.

It should be appreciated that the gaming system may provide the players an award based on the interactive game outcomes in any suitable manner. In one embodiment, the player has to be a member of a player tracking system to win the award. Therefore, if the player is not playing at one of the gaming machines, the gaming system may identify the player and notify the player in any suitable manner. In another embodiment, the gaming system places the award directly into a player account. In another embodiment, if the player makes it to the leaderboard, the player must leave identifying information to receive an award. In another embodiment, a player must be in the gaming establishment to win an award. In another embodiment, the interactive game award is sent to the player or alternatively redeemed by a player when the player returns to the gaming establishment.

It should be appreciated that the gaming system may include any suitable number of gaming machines. In one embodiment, the gaming machines are located at different gaming establishments.

The interactive game may terminate in any suitable manner. In one embodiment, the interactive game terminates based on performance or input of the player. For example, if the player does not reach a certain goal, such as place all of the pieces of a puzzle in the designated spots in a certain amount of time, the interactive game ends. In this embodiment, a player who has a higher skill level will receive more wager triggering events and thus have the possibility of winning greater awards. In another embodiment, the player is allowed to play the interactive game as long as the player is funding the wager components. Therefore, the player has a chance of receiving a better interactive game outcome the longer the player continues to play the interactive game. In one such embodiment, when the player runs out of credits, instead of terminating the interactive game, the gaming machine enables the player to insert more credits to continue play of the interactive game. For example, upon running out of credits, the gaming machine provides the player a countdown of time to insert more credits to continue play of the interactive game.

It should be appreciated that the wager components or microwagers may be determined in any suitable manner. In one embodiment, the wager component amounts are predetermined and the player funds the gaming machine with a certain amount of credits to play the interactive game. In another embodiment, the gaming system enables the player to select the wager component denomination. For example, the gaming enables the player to select among ½ of a cent, ¼ of a cent, $0.01, $0.05, $0.10, $0.25, $0.75 and $1 as the wager components. In one such embodiment, the same amount of credits are wagered for every player for each occurrence of a wager triggering event. In another embodiment, the gaming system enables the player to select the number of credits to wager per wager triggering event. For example, the gaming system enables the player to first select the denomination of the credit and then select to wager 1, 3 or 5 credits for the wager component. In another embodiment, the denomination of the wager component remains the same but the gaming system enables the player to select the number of credits to wager. For example, the wager denomination is $0.25, but the player may select to wager 1, 3 or 5 credits for the wager component. It should be appreciated that the wagering credits may range in suitable value. In one embodiment, the wager component amount is very small but the wager triggering events occur frequently.

In one embodiment, the wager components are different amounts. For example, the player or the gaming system may determine that the wager component for the first five wagering events is a first amount and the wager component for the second five wagering events is a second amount. The wagering outcomes then reflect the different wagering amounts.

In another embodiment, the wager component includes a threshold amount, such as a maximum bet for the wager component. In one embodiment, the wagering of the threshold amount qualifies the player to play a bonus game or to win a progressive award.

It should be appreciated that the wager triggering event may be any suitable event. In one embodiment, the wager triggering event is based on the skill of the player. For example, the wager triggering event is the player achieving a certain number of points in the interactive game. In another example, the wager triggering event is an event that occurs in the interactive game. For example, the wager triggering event is a symbol appearing in a game. In another embodiment, the wager triggering event is an event in the interactive game caused by the skill of the player. For example, the wager triggering event is successfully completing a task, such as hitting a golf ball a certain distance.

In other embodiments, the wager triggering event is independent of the any events occurring in the interactive game. For example, the wager triggering event is a passage of time or a random determination.

In another embodiment, the gaming system enables the player to choose the wager triggering event. In one such embodiment, the gaming system provides the player choices of wager triggering events. In one such embodiment, the gaming system enables the player to choose events that occur less frequently or more frequently, therefore enabling the player to further customize the betting and gaming experience.

In one embodiment, the gaming machine includes a plurality of different wager triggering events. In one such embodiment, the different wager triggering events cause different wager events to occur. For example, a first wager triggering event can cause the placement of a first amount of a first wager component and a second wager triggering event can cause the placement of a second amount of a second wager component. In one embodiment, at least one of the wager triggering events is based on a skill event in the game and at least one of the wager triggering components is based on a non-skill event or random event. It should be appreciated that the gaming machine may include any suitable number of wager triggering events. It should also be appreciated that the wager triggering events may affect any suitable aspect of the interactive game and/or the wagering event in any suitable manner.

In one embodiment, a wager triggering event is the end of an interactive game. In one such embodiment, even if the player does not have enough funding to cover a wager component, the gaming machine may enable the player to wager whatever the player has left in the player's fund. For example, the minimum wager component amount is 10 cents and the player has 7 cents left in the player's fund. In one embodiment, the interactive game is therefore over. In another embodiment, the gaming machine game enables to the player to wager the player's 7 cents in an "all-or-nothing" last-chance wager. In this type of wager, the game may give the player a 7% (7 percent) chance of winning one dollar. If the player is lucky, he can turn his 7 cents into one dollar, which would then allow him to play some more. However, with such a low chance of success, the player may lose the last 7 cents and the interactive game ends or the gaming machine enables the player to further fund the interactive game.

The present disclosure uses examples to disclose the best mode, and also to enable any person skilled in the art to practice the claimed subject matter, including making and using any devices or systems and performing any incorporated methods. The patentable scope of the present disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A gaming device comprising:

an interface unit configured to accept game play data from a player; and a controller coupled to the interface unit, the controller comprising a processor and a memory, wherein the memory stores payback data and wherein the processor is configured to:

receive wager component data from the player;

automatically wager, by the processor, a wager component amount upon an occurrence of each of a plurality of wager triggering events during a single game;

receive, via the interface unit, the game play data from the player playing a game;

evaluate the received game play data based on predefined criteria;

determine a level of skill of the player based at least on the evaluated game play data; and adjust the payback data based on the determined level of skill of the player and the received wager component data.

2. The gaming device according to claim 1, wherein the game is an interactive game comprising one or more of the following: a skill game, a partial skill game, and a pseudo skill game.

3. The gaming device according to claim 1, wherein the payback data includes a look-up table that is adjusted by the controller based on the determined level of skill of the player.

4. The gaming device according to claim 1, wherein the payback data includes a first pay table that is replaced with a second pay table by the controller based on the determined level of skill of the player.

5. The gaming device according to claim 4, wherein the second pay table includes higher payouts than the first pay table.

6. The gaming device according to claim 1, wherein the controller is further configured to determine an occurrence of at least one wager triggering event during play of the game, wherein the at least one wager triggering event may occur a plurality of times during play of the game.

7. The gaming device according to claim 6, wherein the at least one wager triggering event comprises one or more of the following: a point accumulation, a length of time, and a level in the game.

8. A system comprising:

at least one server comprising memory configured to store player data and payback data for a game of skill, wherein the player data includes a level of skill of the player; and a plurality of gaming machines communicatively coupled to the at least one server via a gaming network, each of the plurality of gaming machines comprising a processor programmed to:

receive wager component data from the player;

automatically wager, by the gaming device, a wager component amount upon an occurrence of each of a plurality of wager triggering events during a single game;

receive game play data from the player playing one or more gaming sessions; and provide the received game play data to the server for evaluation, wherein the server:

determines a level of skill of the player based on the evaluated game play data;

adjusts the payback data stored in the memory based on the determined level of skill of the player and the received wager component data; and updates the level of skill of the player stored in the memory.

9. The system according to claim 8, wherein the game is an interactive game comprising one or more of the following: a skill game, a partial skill game, and a pseudo skill game.

10. The system according to claim 8, wherein the server evaluates the received game play data by performing one or more of the following: evaluating the level of skill of the player based on a performance of the player during one or more previous gaming sessions, evaluating the level of skill of the player based on a set of outcomes from one or more previous gaming sessions, and evaluating the level of skill of the player based on performance during a plurality of games involving skill.

11. The system according to claim 8, wherein the server adjusts the payback data by adjusting a look-up table included in the payback data.

12. The system according to claim 8, wherein the server adjusts the payback data by replacing a first pay table with a second pay table.

13. The system according to claim 12, wherein the second pay table includes higher payouts than the first pay table.

14. The system according to claim 8, wherein the processor is further programmed to determine an occurrence of at least one wager triggering event during play of the game, wherein the at least one wager triggering event occurs a plurality of times during play of the game.

15. A method comprising;

receiving wager component data from a player;

accessing payback data for a game;

controlling one or more sessions of the game for the player;

determining at least one occurrence of a wager triggering event during play of the one or more sessions of the game;

automatically wagering, by a gaming device, a wager component amount upon each occurrence of the determined wager triggering events during a single game;

evaluating, based at least on the determined occurrence of the wager triggering event, performance of the player during the one or more sessions of the game;

determining a level of skill of the player based on the evaluated performance of the player; and adjusting the accessed payback data based on the determined level of skill and the received wager component data.

16. The method according to claim 15, wherein the game is an interactive game comprising one or more of the following: a skill game, a partial skill game, and a pseudo skill game.

17. The method according to claim 15, wherein adjusting the payback data includes adjusting a look-up table that is included in the payback data.

18. The method according to claim 15, wherein adjusting the payback data includes replacing a first pay table with a second pay table.

19. The method according to claim 18, wherein the second pay table includes higher payouts than the first pay table.

20. The method according to claim 15, further comprising determining a wagering outcome responsive to determining the at least one occurrence of the wager triggering event.

21. The method according to claim 15, wherein the wager triggering event comprises one or more of the following: a point accumulation, a length of time, and a level in the game.

* * * * *